United States Patent [19]

Payen

[11] 4,359,718
[45] Nov. 16, 1982

[54] DEVICE FOR SWITCHING TWO DIGITAL TRAINS

[75] Inventor: Georges A. Payen, Montrouge, France

[73] Assignee: Societe Anonyme de Telecommunications, Paris, France

[21] Appl. No.: 167,442

[22] Filed: Jul. 9, 1980

[30] Foreign Application Priority Data

Jul. 17, 1979 [FR] France ................... 79 18479

[51] Int. Cl.³ .................... H04Q 9/00; H03K 5/13
[52] U.S. Cl. .................. 340/825.03; 307/269; 371/8
[58] Field of Search ............... 340/147 SC, 147 SY; 375/119, 104, 102; 307/243, 269; 328/72; 371/8, 68

[56] References Cited

U.S. PATENT DOCUMENTS

| 4,009,469 | 2/1977 | Boudreau et al. | 371/8 |
|---|---|---|---|
| 4,017,828 | 4/1977 | Watanabe et al. | 371/8 |
| 4,239,982 | 12/1980 | Smith et al. | 307/269 |

Primary Examiner—Donald J. Yusko
Attorney, Agent, or Firm—Holman & Stern

[57] ABSTRACT

A switching device for transmitting one only of two incoming digital trains in response to a switching demand signal, the digital trains containing identical data signals and clock signals at the same frequency, comprising a switching circuit for the data signals and a switching circuit for the clock signals, and a circuit for controlling the switching circuits which delivers a signal whose changes of state occur, after a change of state of the switching demand signal, only from the moment when the two clock signals are in the same logic state.

3 Claims, 3 Drawing Figures

DEVICE FOR SWITCHING TWO DIGITAL TRAINS

The invention relates to a switching device for transmitting one only of two incoming digital trains in response to a switching demand signal, the digital trains containing identical data signals and clock signals at the same frequency, the device comprising a switching circuit for the data signals and a switching circuit for the clock signals.

Such a device is used in any digital transmission system conveying digital information through two different paths, the selection of the path being dependent on determined criteria peculiar to the system or being controllable from the outside. This is the case, in particular, of digital transmission systems by microwave link, in which the two paths in question are constituted by two microwave channels which convey the same information, one of the channels being a normal transmission channel, and the other an emergency channel which is used in particular when the quality of transmission on the normal channel becomes poor.

It is important that the switching is not noticed by the user, therefore that it involves the minimum of errors, and especially that it does not introduce any additional transition in the clock signal. The introduction of an additional transition in the clock signal is to be avoided absolutely, as it involves the loss of synchronization of the transmission and consequently the total interruption of the transmission.

A known means for obviating the consequences of switching consists in providing an oscillator included in a phase loop which follows the phase of the clock signal chosen, the clock signal furnished by the local oscillator effecting the phase resetting of the binary data transmitted. The phase loop exerts a "flywheel" effect which enables the discontinuity of the clock signal occurring during switching to be eliminated.

However, such a device requires the use of analog integrated circuits. In addition, its adjustment is rather delicate.

The invention relates to a switching device of the type indicated in which the introduction of additional transition during switching is prevented by a very simple means.

To this end, the switching device according to the invention comprises a circuit for controlling the switching circuits which delivers a signal whose changes of state occur, after a change of state of the switching demand signal, only from the moment when the two clock signals are in the same logic state.

The invention is based on the observation that an additional transition is liable to be introduced in the clock signal transmitted only if the two incoming clock signals are in different logic states at the time of switching. Therefore, by validating the switching demand only at the moment when the clock signals are in the same state, the risk of additional transitions being introduced in the clock signal transmitted is eliminated.

In an advantageous embodiment, a band pass filter whose central frequency is equal to the nominal frequency of the clock signals is connected at the output of the switching circuit of the clock signals.

This filter effects the integration of the transitory state introduced by the switching in the clock signal and due to the phase-shift between the incoming clock signals.

The invention will be more readily understood on reading the following description with reference to the accompanying drawings, in which.

Figure 1:
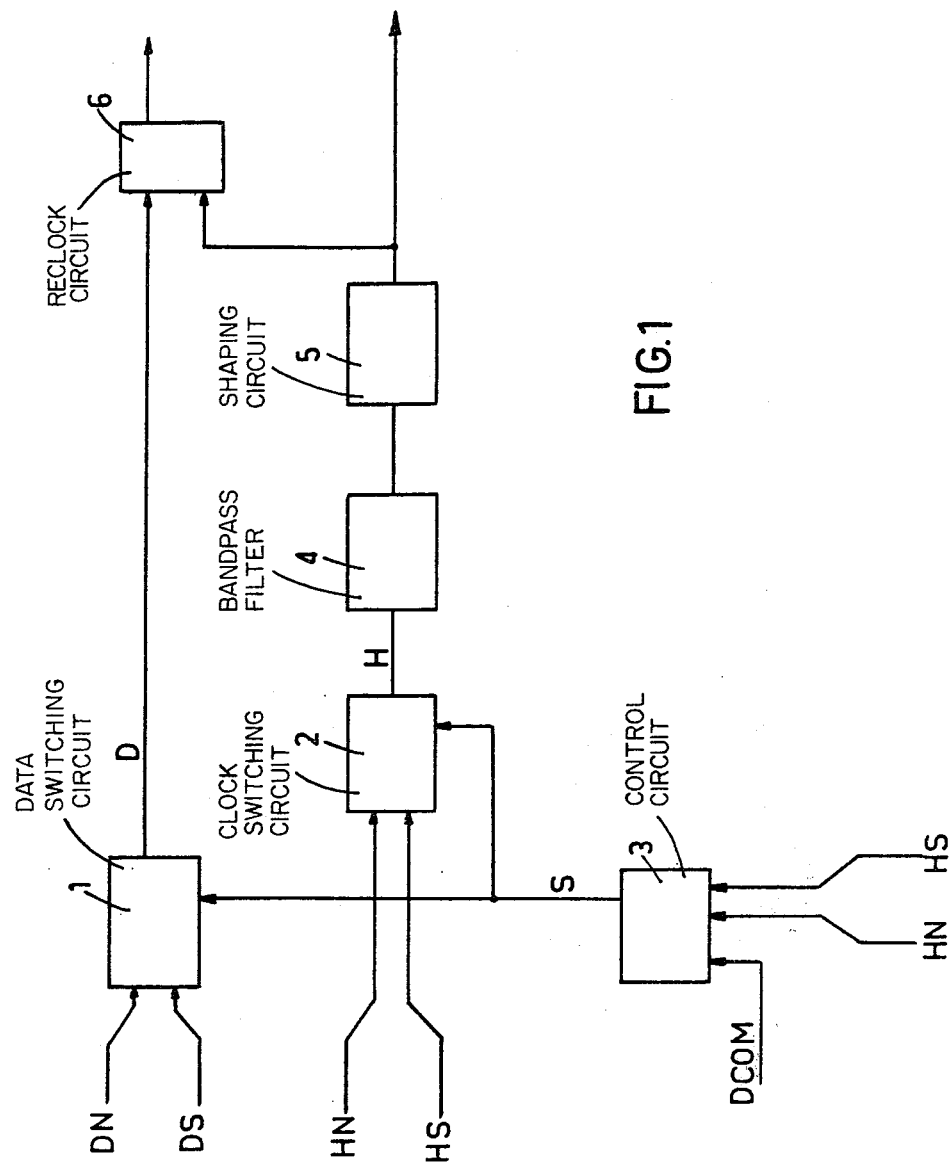
FIG. 1 is a block diagram of the switching device according to the invention.

Referring now to the drawings, the device shown in FIG. 1 comprises a data switching circuit 1 and a clock switching circuit 2. The data switching circuit 1 comprises two inputs for respectively receiving the data signal DN and the data signal DS illustrated in FIG. 2, the signals DN and DS being identical. It transmits one or the other of these signals according to the state of a control signal S which is applied thereto, the output signal of circuit 1 being referenced D.

Similarly, the clock switching circuit 2 transmits a signal H which corresponds either to a clock signal HN or to a clock signal HS. The signals HN and HS have the same frequency, but are phase-shifted with respect to each other by any value $\phi$. The same control signal S is applied to the circuit 2 to control selection of the signal transmitted.

The data and clock signals DN and HN respectively constitute a first digital channel and signals DS and HS a second digital channel. In the case of microwave link transmission, the signals DN and HN constitute a normal channel and the signals DS and HS an emergency channel which is used when the quality of transmission on the normal channel deteriorates.

The control signal S is produced by a control circuit 3 in response to a switching demand DCOM. According to an essential feature of the invention, the control circuit 3 also receives the clock signals HN and HS and produces a control signal, after reception of the switching demand, only when the clock signals HN and HS are in the same logic state, preferably when they are both in state "0".

Figure 2:
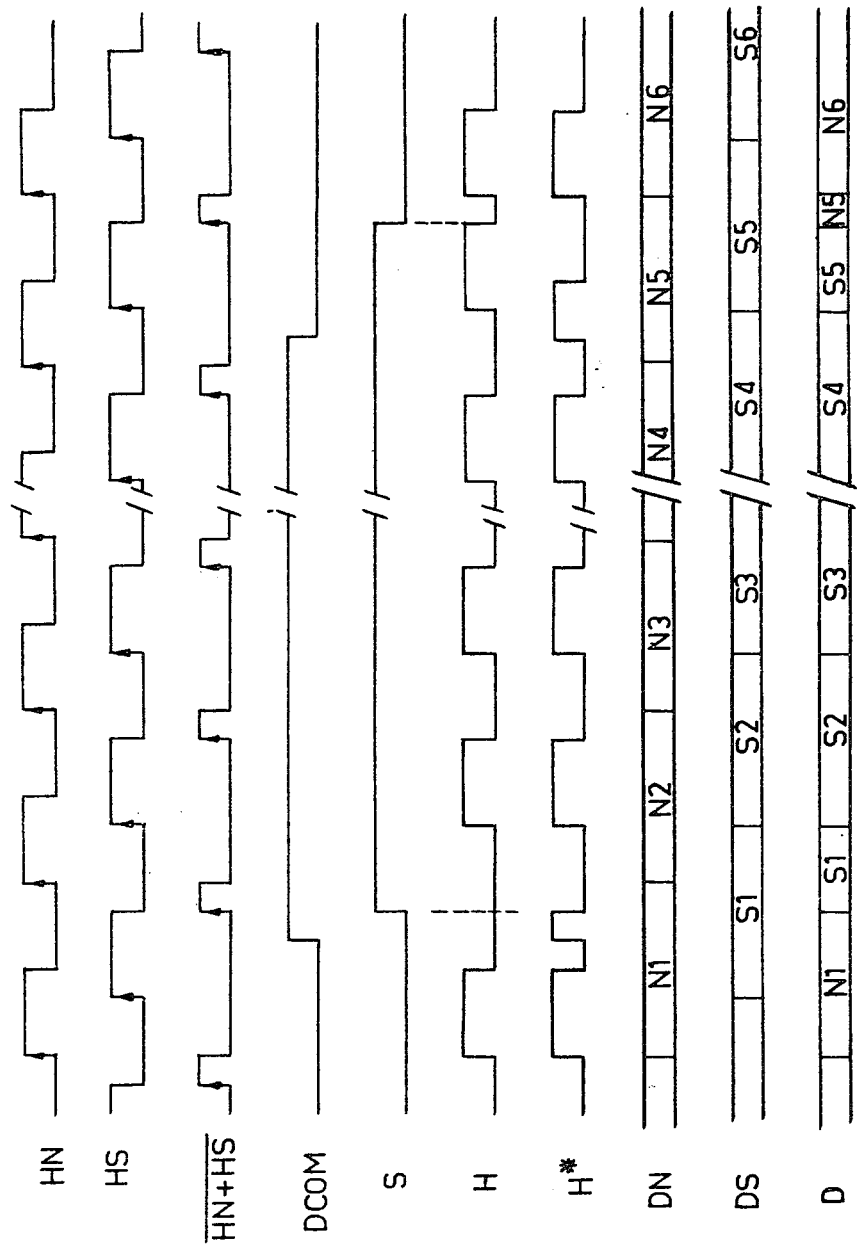
FIG. 2 is a timing chart illustrating the operation of the device.

The operation of the device is illustrated by the timing chart of FIG. 2. Initially, the switching circuits 1 and 2 transmit the signals DN and HN. Then a switching demand is made, the signal DCOM passes from state "0" to state "1". However, the switching demand DCOM is taken into account by the control circuit 3 only from the moment when the two signals HN and HS are in the state "0", the signal $\overline{HN} + \overline{HS}$ then presenting a rising leading edge. It is this rising leading edge which determines the instant of switching. It is seen that the signal D then corresponds to signal DS and signal H to clock signal HS.

At the end of the switching demand, which corresponds to the return to a satifactory quality of transmission on the normal channel, the signal DCOM returns to state "0", and the reverse process takes place: the effective switching is produced upon the first rising leading edge of the signal $\overline{HN} + \overline{HS}$ which follows the end of the switching demand. Again, it is the signals DN and HN which are transmitted by the switching circuits 1 and 2.

The fact of validating the switching demand only upon the rising leading edge of $\overline{HN} + \overline{HS}$ eliminates any risk of undesirable transitions being introduced in signal H. If this procedure of validation were not applied and the switching were effected as soon as the signal DCOM changes its state, the signal H* of FIG. 2 would be obtained, and it is observed, on comparing it with the signal H obtained according to the invention, that it comprises an additional transition introduced upon passage of the signal DCOM to state "1".

The device of FIG. 1 further comprises, connected at the output of the clock switching circuit 2, a bandpass filter 4 with a narrow bandwidth, whose central frequency is the nominal frequency of the clock signals HN and HS. This filter acts to integrate the variation in width of the clock pulse of the signal H transmitted during a switch.

A shaping circuit 5 is connected to the output of the filter 4.

Finally, a reclocking circuit 6 effects the phase reclocking of the data signal D by means of the filtered, shaped clock signal delivered by the circuit 5.

Figure 3:
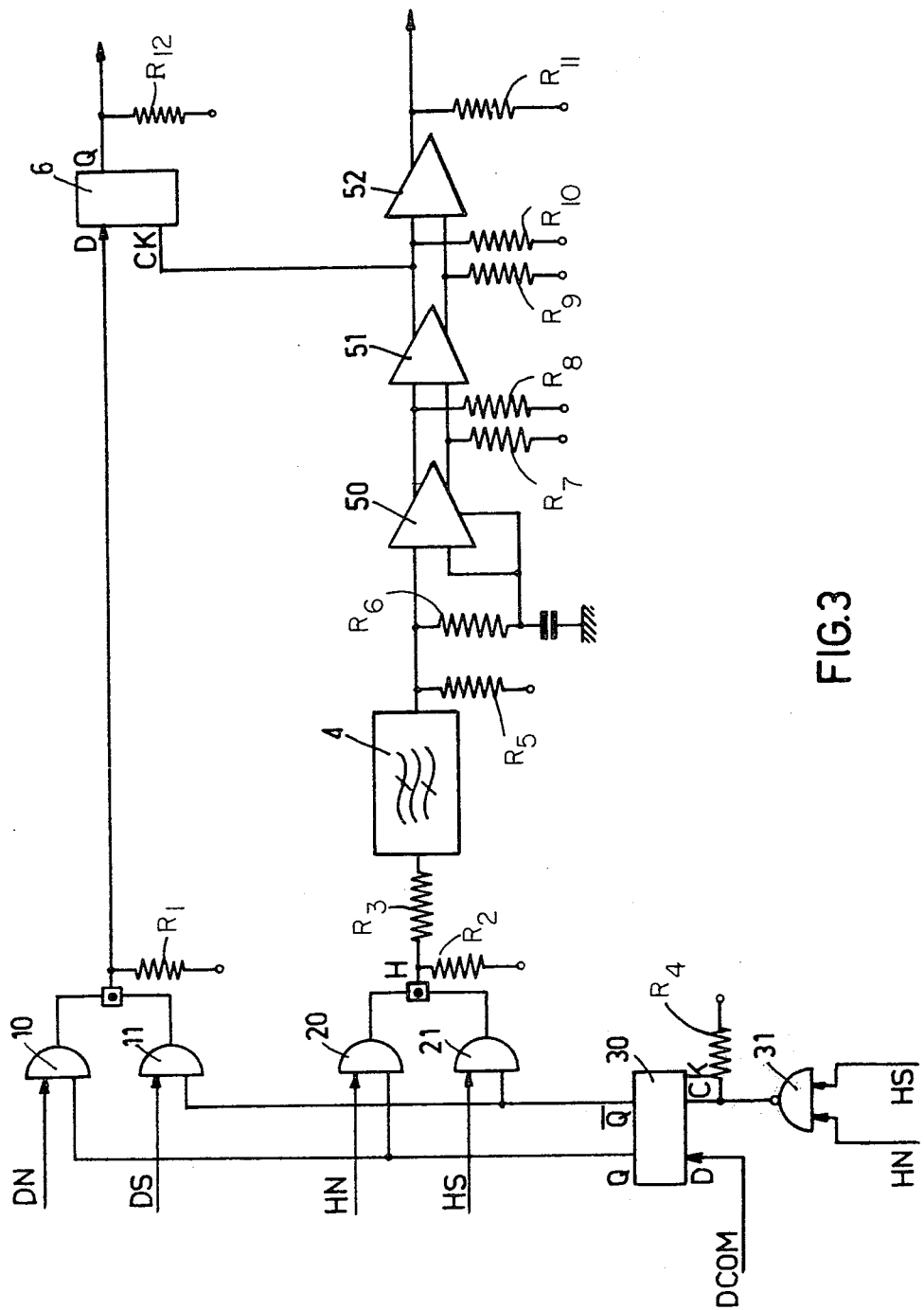
FIG. 3 shows an embodiment.

An embodiment of the device of FIG. 1 is shown in FIG. 3.

The data switching circuit comprises two AND gates 10, 11 whose outputs are connected so as to perform a "wired OR" function.

The gate 10 receives the signal DN and the signal from the output Q of a flip flop 30 belonging to the control circuit, and the gate 11 receives the signal DS and the complementary signal from the output $\overline{Q}$ of a flip flop 30 belonging to the control circuit.

The clock switching circuit similarly comprises two AND gates 20, 21 respectively receiving the signals HN and HS and connected, like gates 10, 11, to the flip flop 30.

The control circuit 3 comprises the flip flop 30 which receives the switching demand signal DCOM at its input D, and a NOR gate 31 which receives the clock signals HN and HS and feeds the signal $\overline{HN} + \overline{HS}$ at the clock input of the flip flop 30. It is clear, under these conditions, that the flip flop 30 delivers at its output Q the signal S shown in FIG. 2.

The shaping circuit comprises in known manner a series of comparators 50, 51, 52 and the resetting circuit 6 is constituted by a flip flop 6 receiving the data signal D on its input D and the signal from the shaping circuit at its clock input.

Concerning the derivation of the switching demand, reference may be made to U.S. patent application Ser. No. 965,866 for the case of microwave links.

What is claimed is:

1. A switching device for transmitting one only of two incoming digital trains in response to a switching demand signal, the digital trains containing identical data signals and clock signals at the same frequency, comprising a switching circuit for the data signals and a switching circuit for the clock signals, and a circuit for controlling the switching circuits which delivers a signal whose changes of state occur, after a change of state of the switching demand signal, only from the moment when the two clock signals are in the same logic state.

2. The device of claim 1, wherein the control circuit comprises a NOR gate receiving the two clock signals and of which the output is connected to the clock input of a flip flop whose input receives the switching demand signal, the control signal being available at the output of the flip flop.

3. The device of claim 1, wherein a band pass filter whose central frequency is equal to the nominal frequency of the clock signals is connected to the output of the switching circuit of the clock signals.

* * * * *